Nov. 5, 1968  E. SCHOPPE, JR., ET AL  3,409,763
FLOW TOTALIZING APPARATUS
Filed Oct. 5, 1964  2 Sheets-Sheet 1
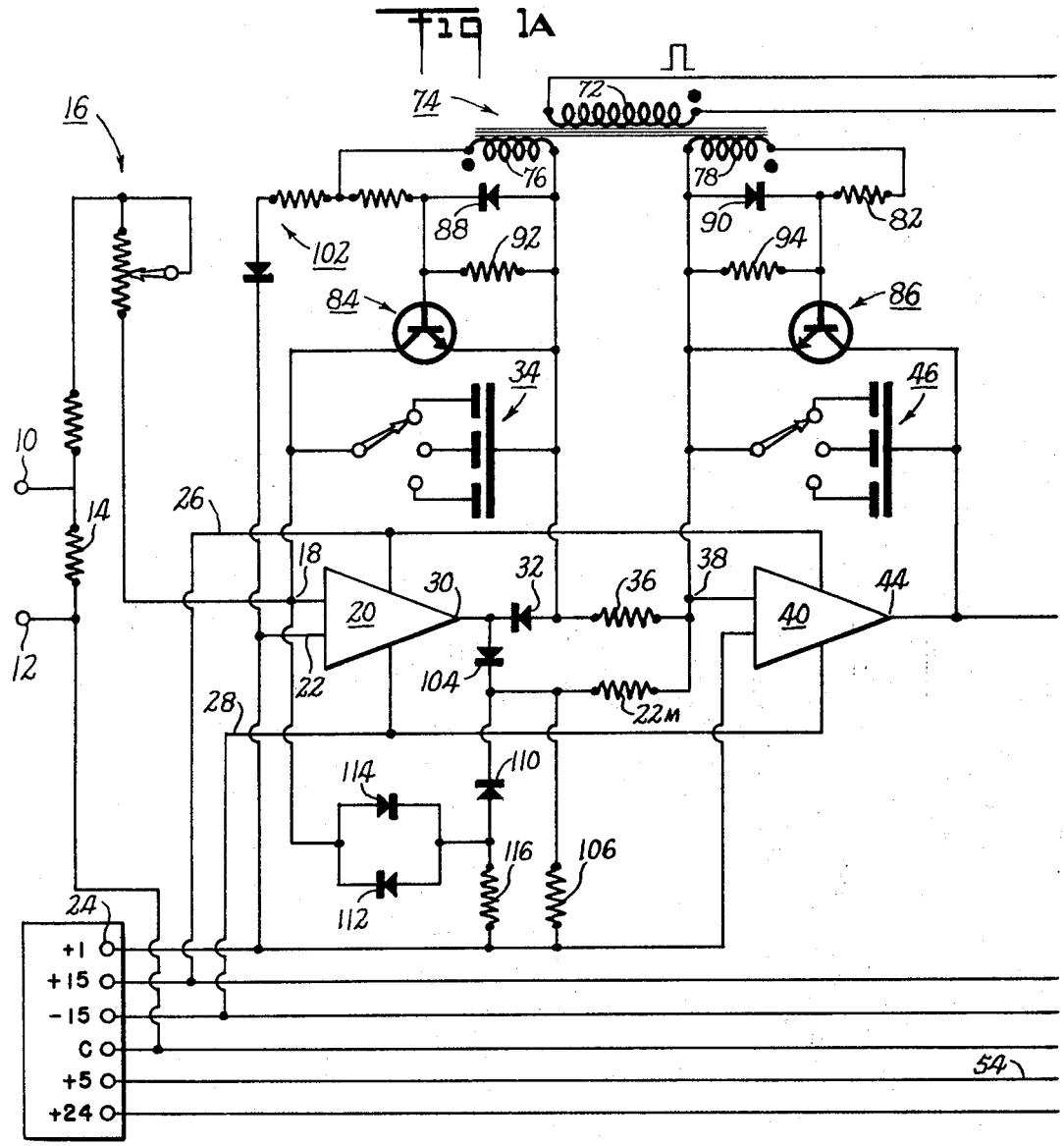
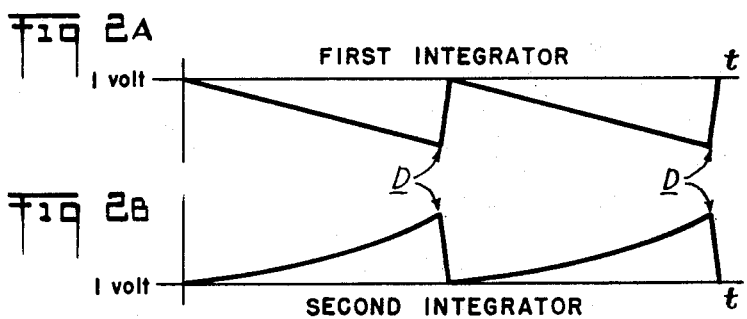
INVENTORS
*Edward Schoppe, Jr.*
*William E. Earle*
*Richard P. Lawler*
BY
*Curtis Morris + Safford*
ATTORNEYS

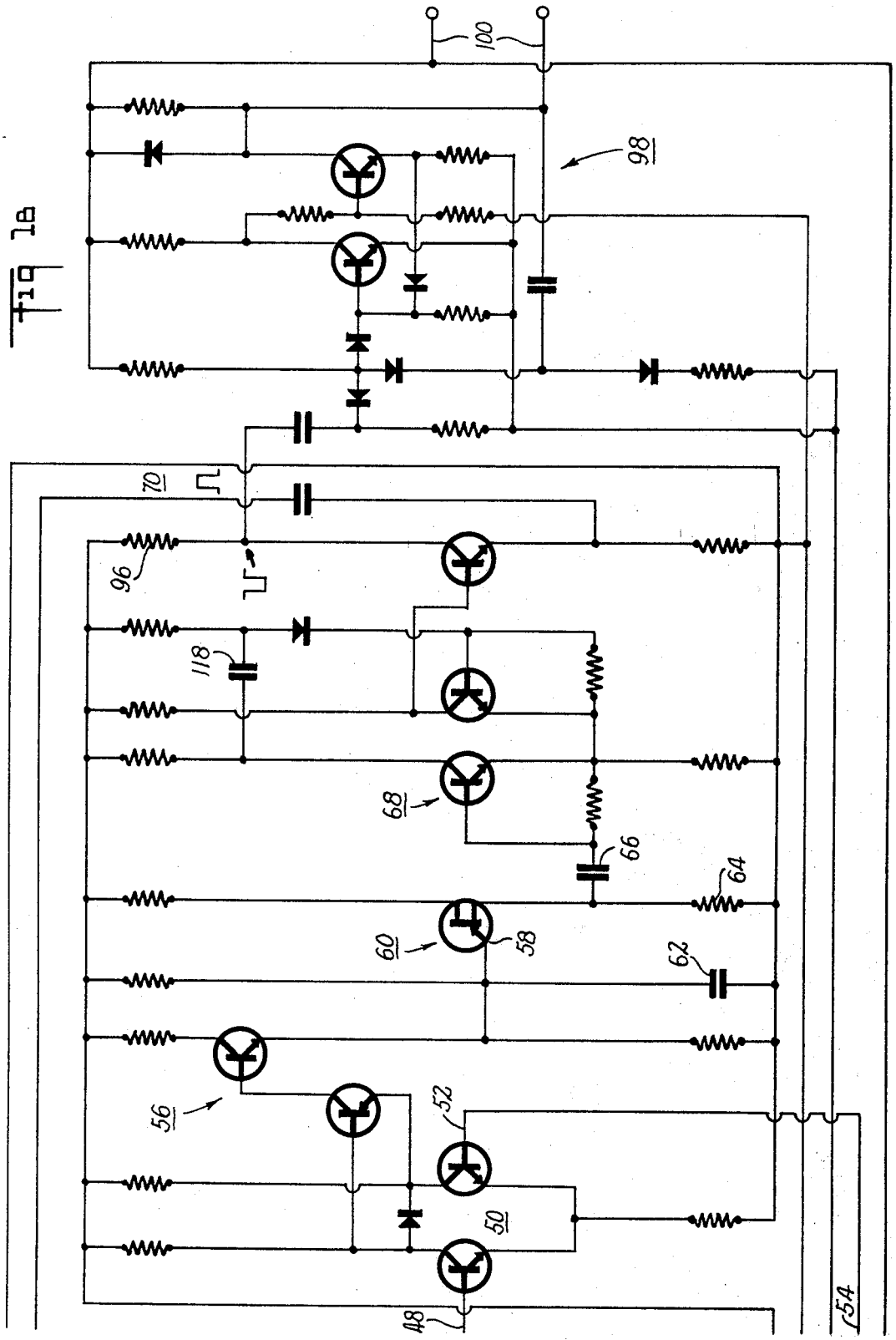

United States Patent Office 3,409,763
Patented Nov. 5, 1968

3,409,763
FLOW TOTALIZING APPARATUS
Edward Schoppe, Jr., Walpole, Richard P. Lawler, Mansfield, and William E. Earle, North Easton, Mass., assignors to The Foxboro Company, Foxboro, Mass.
Filed Oct. 5, 1964, Ser. No. 401,372
6 Claims. (Cl. 235—151.34)

ABSTRACT OF THE DISCLOSURE

A fluid flow totalizing instrument adapted to receive an electrical flow measurement signal having a square-law characteristic and to produce an output in the form of a series of pulses each representative of a certain amount of fluid, the instrument being of the type having two cascaded integrating amplifiers followed by a comparator in the form of a differential amplifier arranged to produce a control signal whenever the integrated signal reaches a predetermined level, the output of the differential amplifier being directed to a one-shot multivibrator adapted to deliver a control pulse of predetermined short duration through a transformer and to the control electrodes of a pair of transistors each connected across a respective integrating capacitor of the two amplifiers, thereby to discharge both capacitors simultaneously; the instrument further being provided with a bias circuit arranged to prevent the integration of noise signals when there is no flow.

---

This invention relates to flow measuring apparatus. More particularly, this invention relates to apparatus for providing an output signal representing the total quantity of flow over a period of time.

In many industrial applications, it is necessary to measure the total quantity of fluid that has flowed from one place to another during a given period of time. In some instances, this has been accomplished by making a chart record of the flow rate (e.g. by placing an ink trace on a circular chart rotating at constant speed), and then integrating the area defined on this chart through the use of a planimeter to find the total volumetric flow. Although reasonably accurate, this approach obviously suffers considerably in convenience and speed.

Another approach to flow integration is taught in U.S. Patent 2,930,231, issued to H. L. Bowditch. There an instrument is provided having an air-driven turbine which rotates at a speed corresponding to a pneumatic measurement signal representing fluid flow rate and developed by a conventional flow meter arranged to sense the differential pressure across an orifice in the flow line. Such a flow measurement signal is proportional to the square of the rate of fluid flow, and to compensate for this characteristic the air supplied to the turbine is automatically adjusted to provide a balance between a force proportional to the measurement signal and a feedback force produced by a flyball weight rotating with the turbine. Since this flyball force is proportional to the square of the turbine speed, the turbine speed always will be directly proportional to fluid flow rate. The turbine drives a conventional mechanical counter to indicate the total quantity of fluid flow at any time.

The flyball flow integrator described in that patent was, of course, designed for pneumatic systems, i.e. applications where pneumatic flow signals are used. In the case where the flow measurement appears in the form of an electrical signal (such as a 10 to 50 milliamp D-C signal produced by the flow transmitter of U.S. Patent 3,051,933, issued to Cressy et al. on Aug. 28, 1962), a different approach must be used to totalize the fluid flow.

Although various proposals have been made from time to time to provide suitable apparatus for accomplishing this result, none of these proposals has been entirely satisfactory, for various reasons.

Accordingly, it is an object of this invention to provide improved apparatus for totalizing fluid flow. Another object of this invention is to provide such apparatus which is operable by a direct-current flow measurement signal. It is still another object of this invention to provide such apparatus which is accurate and reliable in operation, yet economical to construct. A more specific object of this invention is to provide such apparatus which automatically develops a square-root compensation, so that the apparatus can be used with a differential-pressure flow meter or the like. Other objects, aspects and advantages of this invention will in part be pointed out in, and in part apparent from, the following description considered together with the accompanying drawings, in which:

FIGURE 1, shown in two portions as FIGURE 1A and FIGURE 1B, is a schematic diagram showing the circuit of an illustrative embodiment of the invention; and FIGURE 2, shown in two portions as FIGURE 2A and 2B, shows certain voltages as a function of time during operation of the instrument.

Referring now to the left-hand edge of FIGURE 1, the flow totalizing instrument includes a pair of input terminals 10 and 12 to which is directed a D-C flow measurement signal in the range of 10 to 50 milliamps, e.g. produced by a flow transmitter such as described in the above-mentioned U.S. Patent 3,051,933. This current passes through a resistor 14, of 100 ohms, to produce a measurement signal of between one and five volts over the full range of flow rate. That is, a one volt signal indicates that there is no flow, and a five volt signal indicates a full-scale flow (the actual amount depending, of course, upon the calibration of the instrument).

The signal developed across resistor 14 is directed through an input resistance 16 (consisting of a fixed resistor and an adjustable resistor) to the summing node 18 of an operational amplifier 20. The other input lead 22 of this amplifier is connected to a positive one-volt reference supply 24 so that, when the measurement signal is one volt for zero flow rate conditions, the actual input voltage to the amplifier will be zero.

This amplifier 20 may be of any conventional high-gain design, and preferably utilizes solid-state components to assure high reliability. The amplifier is provided with the usual positive and negative supply leads 26 and 28 and is so arranged that the potential of its output terminal 30 is one volt positive when the amplifier input is zero, i.e. for a no-flow condition.

The output terminal 30 of amplifier 20 is connected through a diode 32 to a negative feedback circuit comprising a switchable capacitor 34 the remote plate of which is returned to the summing node 18. When the input voltage across terminals 10 and 12 significantly exceeds one volt, the amplifier output is driven negative, and the feedback connected through capacitor 34 tends to maintain the summing node 18 at its original potential (i.e. one volt). As is well known in the art of operational amplifiers, the feedback action will maintain the current flowing into the capacitor 34 essentially equal to the current through the input resistor 16, and this capacitor therefore charges up at a rate directly proportional to the magnitude of the input voltage. (The charge rate also depends, of course, upon the RC time-constant defined by the input resistor and feedback capacitor but this factor will be constant during operation of the instrument.)

Thus the output voltage developed by the amplifier 20 represents the time-integral of its input voltage. When this input voltage is constant, the output voltage will change in a linear fashion, as illustrated in the graph of FIGURE 2a.

The output from amplifier 20 is directed through another input resistor 36 to the summing node 38 of a second operational amplifier 40. The other input lead 42 of this amplifier is connected to the one-volt supply 24. This amplifier preferably is identical to the first amplifier 20, and its output terminal 44 also is connected to a negative feedback circuit comprising a switchable capacitor 46 the remote plate of which is returned to the summing node 38.

The operational amplifier 40, with its input resistor 36 and negative feedback capacitor 46, serves as does the first amplifier 20 to produce an output voltage representing the time-integral of any signal delivered to its input. Thus the output of the second amplifier represents a second and simultaneous integration of any signal applied to the input of the first amplifier. If this input signal is constant, the output of the first amplifier will change linearly as shown in FIGURE 2a, but this linearly changing signal when applied as an input to the second amplifier 40 will produce at the output 44 a voltage which increases at a continuously increasing rate as shown in FIGURE 2b.

The voltage developed at the output terminal 44 is connected to one input 48 of a conventional differential amplifier 50, the other input 52 of which is connected to a positive five-volt supply lead 54. When the input 48 reaches five volts, amplifier 50 produces an output signal which is directed to a two-stage transistor amplifier generally indicated at 56. This amplifier intensifies the output of the differential amplifier and directs a corresponding signal to the input terminal 58 of a double-base transistor 60. This latter transistor thereupon fires to discharge a capacitor 62 through a resistor 64.

The discharge of capacitor 62 produces across resistor 64 a sharp pulse which is directed through a coupling capacitor 66 to a one-shot multivibrator of conventional construction and generally indicated at 68. This multivibrator circuit functions in known manner to produce across its output leads 70 a square-topped control pulse of predetermined time duration, e.g. 150 microseconds. This pulse is fed to the primary winding 72 of a transformer 74 having two secondary windings 76 and 78, and operates to stop the integrating action of the two amplifiers 20 and 40 and to reset them to their initial conditions as will now be described.

The square-topped control pulses developed at secondary windings 76 and 78 are directed through respective series current-limiting resistors 80 and 82 to the control electrodes of corresponding transistors 84 and 86. These transistors are normally non-conductive, and are simultaneously made heavily conductive by the control pulse. The output terminals of these transistors are connected directly across capacitors 34 and 46 so that, when the transistors become conductive, the two capacitors are discharged as shown in FIGURES 2a and 2b at the time indicated by the letter D.

When the control pulse applied to the two transistors subsides, these transistors revert to their normal state presenting a high resistance across the two feedback capacitors. Thus, the operational amplifiers immediately initiate a new integration, starting from the initial conditions as before with the capacitors discharged and the amplifier outputs at one volt positive. The transistor control circuits are provided with shunt diodes 88, 90 and resistors 92, 94 to absorb the oscillatory energy of any reverse-polarity swings, thereby to assure stable and consistent operation of the switching circuitry.

Thus it will be apparent that both of the feedback capacitors are simultaneously charged and then discharged during the operation of the instrument. The repetition rate of this operation, i.e. the frequency of the control pulses produced by the one-shot multivibrator 68, is determined by the magnitude of the signal applied to the input terminals 10 and 12. In general, the larger this signal the higher the frequency. More specifically, the frequency of control pulses is proportional to the square-root of the voltage applied to the first amplifier 20.

This can better be understood by considering first that amplifier 20 and its associated control circuitry is eliminated, that the input resistor 16 is connected directly to the summing node 38 of the second amplifier 40, and that the polarity of the input potentials are reversed by conventional switching circuitry (not shown). With such a modified arrangement, it can readily be shown that the time required for the amplifier output to increase from initial conditions to the voltage at which discharge of the feedback capacitor occurs is given essentially by the expression:

$$t = \frac{R_1 C_1 E_R}{E_1}$$

where $R_1$ is the value of the input resistor 16 in ohms
$C_1$ is the value of feedback capacitor 46 in farads
$E_R$ is the amplifier output voltage at the start of capacitor discharge
$E_1$ is the amplifier input voltage (between 0 and 4 volts)

For continuous operation, the frequency of the control pulses is the reciprocal of this charging time, and thus the frequency is directly proportional to the variable (input voltage). This is a "linear" integrator, in that the total number of pulses that have occurred over any period of time is directly proportional to the time-integral of the instrument input voltage over that period of time. In an application where this input voltage is directly proportional to a fluid flow rate, the total number of pulses would represent the total quantity of fluid flow.

In most intsances the fluid flow signal is not directly proportional to flow rate but is, instead, proportional to the square of the flow rate. For this application, the complete circuit arrangement of FIGURE 1 is used, that is, the output of the first integrating amplifier 20 is applied to the input of the second integrating amplifier 40. With this arrangement, it can be shown that the time required for the output of amplifier 40 to go from initial conditions to the voltage where the feedback capacitors are discharged is given essentially by the expression:

$$t = \sqrt{\frac{2R_1 C_1 R_2 C_2 E_R}{E_1}}$$

where $R_1$ is the value of the first input resistor 16 in ohms
$C_1$ is the value of the first feedback capacitor 34 in farads
$R_2$ is the value of the second input resistor 36 in ohms
$C_2$ is the value of the second feedback capacitor 46 in farads
$E_R$ is the output voltage of the second amplifier 40 at the start of capacitor discharge
$E_1$ is the first amplifier input voltage (between 0 and 4 volts)

For continuous operation, the frequency of the control pulses as the reciprocal of this charging time, and therefore it is evident that the pulse frequency is proportional to the square-root of the flow signal. Consequently, the total number of pulses accumulated over a given period of time will be directly proportional to the quantity of fluid flow during that period of time.

Returning now to the detailed description of the instrument, the one-shot multivibrator 68 produces across an output resistor 96 a second pulse coincident with the control pulse on leads 70. This second pulse is directed to a so-called "pulse-stretching" circuit 98, of conventional design, arranged to produce on its output leads 100 a relatively long and high-powered pulse for each control developed by the one-shot multivibrator. This long output pulse is fed to any of the usual electro-mechanical counters (not shown herein) to produce a visible representation of the total number of pulses during any given period of time. Such counter thus provides a directly readable measure of the total quantity of fluid flow during that period of time.

Under some circumstances, noise on the flow measurements leads can cause a flow totalizing instrument to produce an output indication when the flow actually is zero. For example, noise in the form of electrical fluctuations on the input of amplifier 20 can produce a finite negative voltage at the amplifier output. This voltage, even though small, will be steadily integrated by the second amplifier 40 to produce, utilimately, a signal large enough to activate the differential amplifier 50 and develop an output pulse from the instrument. Thus the instrument would erroneously indicate that there had been fluid flow when in fact no flow had occurred.

To eliminate errors of this character, the instrument is provided with a biasing circuit which prevents integration until the amplifier input signal reaches about 1.04 volts, i.e. corresponding to 1% of full scale. In more detail, as the end of the timed control pulse is reached, a diode circuit 102 connected to the transformer secondary 76 is momentarily energized by the induced voltage to cause a flow of current into the positive terminal of the one-volt power supply 24. This flow of current raises the potential of the supply terminal to about 1.04 volts, due to the voltage drop across the internal source resistance. Thus, if the flow rate actually is zero at this moment, the input to the amplifier 20 would be a negative signal of about .04 volt. This is sufficient to drive the amplifier output positive by a substantial amount, i.e. approximately 10 volts. This positive output will cause a flow of current through a Zener diode 104 and a resistor 106 into the one-volt supply, as an additional influence tending to hold the potential of the supply terminal above one volt. The current flow thus "locks up" the amplifier so that its output remains positive after the diode circuit 102 ceases conduction when the control pulse subsides. It should be noted that the reverse-connected diode 32 in the amplifier output assures that there will be no charging of the feedback capacitor 34 while the amplifier output is positive.

With the amplifier input biased to 0.04 volt, there will be no integration due to normal noise signals on the measurement leads, i.e. while the flow actually is zero. However, if fluid flow commences, the resultant input signal (which as a practical matter always will be greater than 1% of full scale) will overcome the 0.04 volt bias and cause the amplifier output to go negative. This will start integration in the manner explained hereinabove. Also, current will no longer pass through Zener diode 104, and thus the bias on the amplifier input will be removed so that there will be no error introduced by this bias potential during integration.

When the amplifier 20 is locked up by the bias voltage at the input circuit, it is desirable to limit the amplifier positive output to a reasonable level. This is accomplished by a Zener diode 110 which is non-conductive until the amplifier output reaches about 10 volts. At that point, conduction commences through this diode and through an isolation diode 112 back to the summing node 18, thereby clamping the amplifier output to a potential of about 10 volts.

It also has been found desirable, for purposes of stability, to limit the amplifier negative output to about 10 volts. This is accomplished in part by the first Zener diode 104 which commences conduction at about 10 volts negative. This current comes through Zener diode 110 and another isolation diode 114 connected to the summing node 18 of the amplifier, and serves a clamp the amplifier output at about 10 volts negative. A resistor 116 provides a low resistance return path for the leakage current of the Zener diodes 104 and 110 during normal integrating operation of the instrument (i.e. when the amplifier output is not limited), thereby to assure that this leakage current does not flow back to the amplifier input and cause erroneous readings.

The calibration of the instrument, that is, the number of pulses per second for maximum flow rate, depends upon the values selected for the input resistors and feedback capacitors of the two cascaded integrators. Ganged switching means are provided for connecting different-sized capacitors in the feedback circuits, in order to make a coarse adjustment of the calibration, and a fine adjustment is made by varying resistor 16.

In an actual commercial instrument constructed in accordance with this invention, the pulse-repetition-rate adjustment range was between 1 and 10 pulses per second, for maximum flow rate conditions. At 10 pulses per second, the time between pulses will be 100 milliseconds; thus a discharge control pulse of 150 microseconds represents only 0.15% of the charge time, thereby permitting highly accurate totalizing of flow. If the pulse repetition rate range is reduced, and the charge time thus increased, it may be desirable to correspondingly increase the time duration of the control pulse, and capacitor 118 in the one-shot multivibrator may be made adjustable for this purpose.

Although a preferred embodiment of the invention has been set forth in detail, it is desired to emphasize that this is not intended to be exhaustive or necessarily limitative; on the contrary, the showing herein is for the purpose of illustrating the invention and thus enable others skilled in the art to adapt the invention in such ways as meet the requirements of particular applications, it being understood that various modifications may be made without departing from the scope of the invention as limited by the prior art.

What is claimed is:

1. In a fluid flow totalizing instrument of the type comprising first and second operational amplifiers each having an input resistor and a capacitor feedback circuit to provide integrating action, the output of the first amplifier being coupled to the input of the second amplifier, there being provided signal comparator means having one input coupled to the output of the second amplifier and a second input supplied with a reference signal of fixed magnitude, the comparator means being operable to produce a control signal when the output of the second amplifier reaches a predetermined magnitude relative to the reference signal, and resetting means responsive to such control signal for discharging the capacitors of both of said amplifiers whereby to initiate a fresh integrating action; that improvement in said instrument wherein a pulse-forming circuit is coupled to the output of said comparator means to produce said control signal in the form of a pulse signal, said pulse-forming circuit including time-delay means for fixing the time duration of said pulse to a predetermined magnitude which is maintained consistently through all operating cycles; first and second signal-responsive electronic switches each comprising a variable impedance element normally presenting a relatively high impedance between the terminals thereof, both of said variable impedance elements including a control electrode operable when activated by said control signal to change the impedance between said terminals rapidly and sharply to a relatively low value, each of said switch means being connected across a respective capacitor of said amplifier feedback circuits; and circuit means for directing said control pulse to said control electrodes so as to discharge said capacitors simultaneously and for the duration of each control pulse.

2. The instrument of claim 1, including a transformer having a primary winding and two secondary windings, said primary winding being coupled to the output of said pulse-forming circuit, said secondary windings being couple respectively to said control electrodes of said variable-impedance elements.

3. The instrument of claim 1, wherein said comparator means comprises a differential amplifier with first and second transistors, means coupling the input terminal of one of said transistors to the output of said second operational amplifier, means for coupling the input terminal of the second transistor to a source of reference potential; a third transistor coupled between the outputs of said first and second transistors to produce an output signal whenever the output of the second operational amplifier reaches said predetermined magnitude; and a one-shot multivibrator coupled to the output of said third transistor to produce said control pulse with said predetermined time duration.

4. In a fluid flow totalizing instrument of the type comprising first and second operational amplifiers each having an input resistor and a capacitor feedback circuit to provide integrating action, the output of the first amplifier being coupled to the input of the second amplifier, there being provided signal comparator means having one input coupled to the output of the second amplifier and a second input supplied with a reference signal of fixed magnitude, the comparator means being operable to produce a control signal when the output of the second amplifier reaches a predetermined magnitude relative to the reference signal, and resetting means responsive to such control signal for discharging the capacitors of both of said amplifiers whereby to initiate a fresh integrating action; that improvement in said instrument wherein bias circuit means are provided to prevent integrating noise signals when there is no fluid flow, said bias circuit means comprising means to develop in the input circuit of said first amplifier a bias voltage of small magnitude sufficient by itself to prevent integrating action; and bias deactivating means responsive to a flow measurement signal of predetermined magnitude and operative to disable the bias action during a flow integrating cycle.

5. The instrument of claim 4, wherein said bias circuit means includes lock-up means responsive to the output of one of said amplifiers and operative thereby to maintain a bias voltage in the input circuit of said first amplifier until integrating action develops.

6. The instrument of claim 5, wherein said bias circuit means includes means responsive to said control signal for initiating development of the bias voltage in the input circuit of said first amplifier.

References Cited

UNITED STATES PATENTS

| 3,096,434 | 7/1963 | King | 235—183 X |
| 3,129,326 | 4/1964 | Balaban | 328—127 X |
| 3,231,728 | 1/1966 | Kusto | 235—183 |
| 3,249,748 | 5/1966 | Fluhr | 235—183 |

MALCOLM A. MORRISON, *Primary Examiner.*

J. RUGGIERO, *Assistant Examiner.*